E. GRENET, Jr.
GALVANIC BATTERY.
No. 25,503.                                         Patented Sept. 20, 1859.
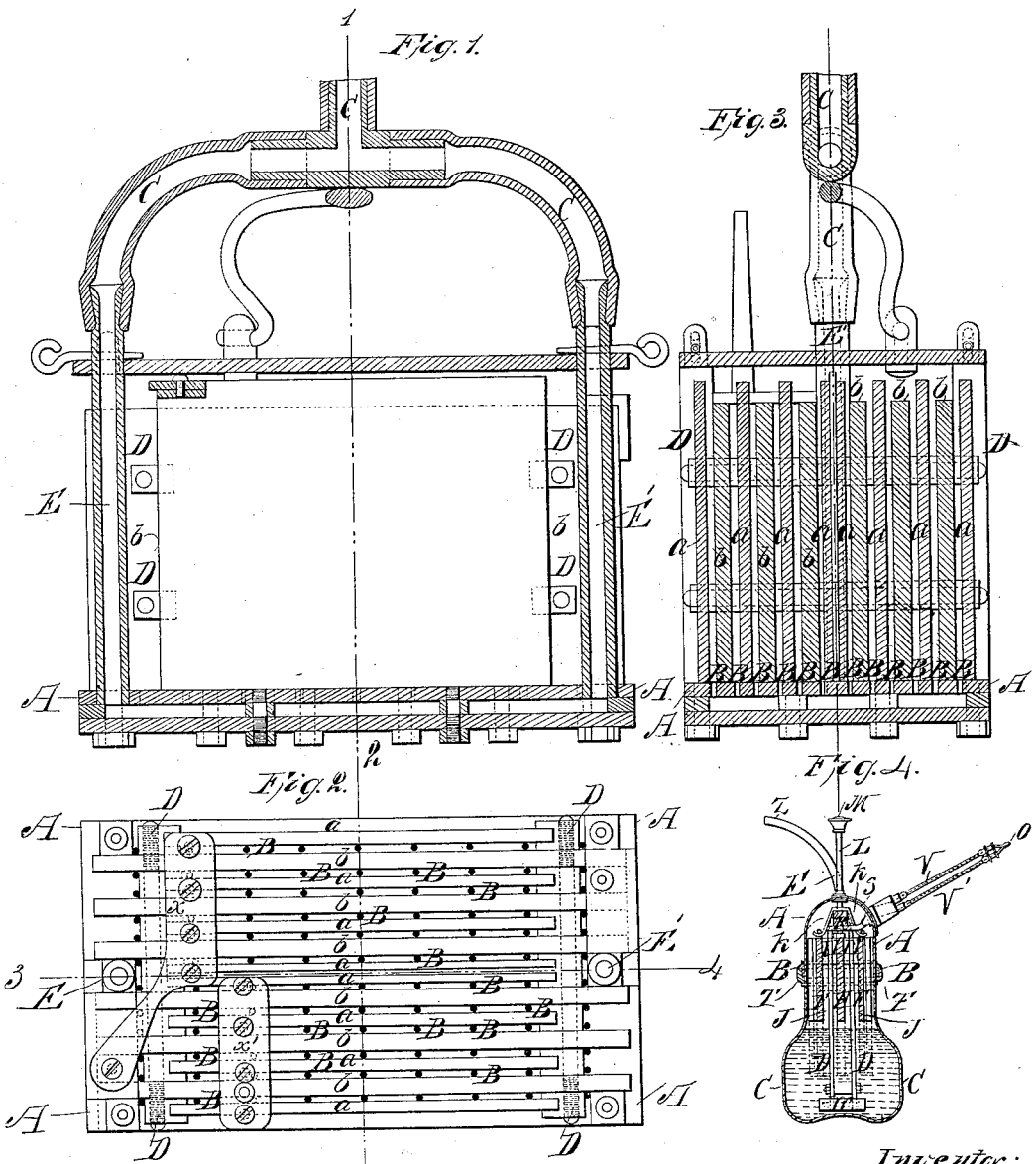
Witnesses:
Inventor:

UNITED STATES PATENT OFFICE.

EUGENE GRENET, JR., OF PARIS, FRANCE.

IMPROVED GALVANIC BATTERY.

Specification forming part of Letters Patent No. 25,503, dated September 20, 1859.

*To all whom it may concern:*

Be it known that I, EUGENE GRENET, Jr., of Paris, in the Empire of France, have invented certain new and useful Improvements in Galvanic Batteries, of which the following is a full, clear, and exact description, reference being had to the accompanying drawings, making part of this specification.

The nature of my invention relates to galvanic batteries composed of positive and negative elements formed of any suitable metals or substances held in a bath of a strongly oxygenated solution; and it consists in the employment of an exciting-fluid which is caused to be constantly agitated. This may be effected in different ways, but mainly by forcing a current of air therethrough.

My invention further consists in forming a galvanic battery of zinc and charcoal, respectively, for the positive and negative elements thereof, so arranged that the whole may be immersed into the liquid and removed therefrom at pleasure, said liquid being highly oxygenated and formed of bichromate of potassa, chromic acid, binoxide of manganese, and diluted with water acidulated by sulphuric or other suitable acid, and which is agitated by blowing air into and through it.

My invention lastly consists in forming the charcoal elements by pressing into or onto the surface of plates of lead when yet in a semiliquid state small pieces of charcoal.

My new battery may be applied for telegraph purposes, dentistry, surgery, for producing light and other electric phenomena, and also to machinery actuated by electricity.

To enable others skilled in the art to make, construct, and use my invention, I will now proceed to describe it in detail.

In the accompanying drawings, Figures 1, 2, and 3, represent, respectively, the elevation, plan, and side view of a battery constructed according to my improvement.

Each pair of elements consists of plates of zinc $a$ and of charcoal $b$ arranged alternately with respect to each other, and kept in their proper relative position by means of cross-bars D formed of an insulating substance. The zinc plates may be made of a somewhat smaller size than those of charcoal.

All the plates of the same material are connected by a common conductor, $x$ $x'$, and so arranged that contact with the plates or conductor of the other set is avoided.

The whole battery is so arranged as to be easily and readily plunged in or withdrawn from the liquid.

At the bottom of the trough is arranged a horizontal plate, A, provided with a number of vertical holes, B, corresponding to the free spaces between the plates of the battery. This plate A communicates by means of the tubes E E' and C with a blowing apparatus.

Immediately on the battery being plunged into the exciting-liquid, and the blowing apparatus set in operation, the air will be forced in through the small holes B and produce violent agitation of the fluid. The current thus produced remains uniform as long as the insufflation is continued and the fluid maintained in the same state.

The liquid may be renewed either by changing the whole contents at stated intervals of time or by a uniform influx supplied continuously or intermittently; but when its power of dissolving is exhausted it is subjected to evaporation, in order that the remainder contained therein may be obtained.

A tension-battery may be formed by placing several such cells side by side and arranging them in a series.

Here I wish to state that this method of agitating the fluid by blowing in air into and through it is not only applicable to batteries constructed on my improved plan, but it can also be introduced with great advantage for all other batteries, whatever their arrangement and the exciting-fluid be. The two operations of agitating the liquid by the forced introduction of air and the constant renewing of the exciting-fluid are equally necessary to the preservation of the uniform energy of the current. It is also very important to employ a liquid sufficiently oxygenated, as by the use of water acidulated with sulphuric acid only no satisfactory results will be obtained.

The advantages derived from my method of constructing and arranging a galvanic battery are as follows: First, that a battery of my construction, as compared with one known as the "Bunsen battery," will require but one-twentieth of the surface of the active elements used by Bunsen to evolve the same quantity of electricity; second, that the elements are immersed in a liquid which is a very good conductor of electricity, and which possesses a high degree of oxidizing action; third, that the elements are exposed to the oxidizing action of the air; fourth, that the action of the air on the elements prevents their polarization; fifth, that there is but one liquid used, and which is devoid of noxious odor or vapor; sixth, that the battery occupies but a small space and is easily transportable; seventh, that the porous vessels can be dispensed with; eighth, that it can be readily and advantageously employed and adapted to all and any required purpose, as it not only occupies a small space, but possesses the required quantity of electricity at a comparatively small expense and with little trouble.

As it is very difficult to obtain charcoal of sufficient size to form large elements out of one piece, I make them by first casting lead into thin plates of the required shape and then pressing into its surface (before it is solidified) small pieces of charcoal, so as to constitute a compact outer layer of charcoal.

On account of the high degree of power evolved by these batteries, they can be constructed, for many practicable purposes, of very small dimensions. In Fig. 4 is represented a portable battery, so arranged as not to act any longer than it is required for any special purpose, and which can be operated by one hand only, leaving the other hand free to act and execute any required operation. The elements are wholly inclosed in a cap or vessel, A, made of glass or other suitable material. This cap is made to fit securely over the receptacle C by being screwed into the collar T of the latter.

The liquid may be introduced into the receptacle C before closing it with the cap, or it may be poured into it, after the cap A has been fitted over it, through a glass-tube, E, to the upper end of which is connected a flexible tube made of caoutchouc, for the purpose of blowing or forcing air into the liquid. The two charcoal elements D, which are made to reach the bottom of the vessel, so that they should be constantly immersed in the liquid, are provided at their lower end with a hollow piece, W, perforated with a number of holes. The tube E connects with this piece W, through which the insufflated air is dispersed through the liquid.

The charcoal plates are provided with vertical slots T, in which are made to slide the india-rubber washers I. To these are secured the zinc plates F and the india-rubber sheets H, the whole being held up by means of india-rubber suspenders K. A rod, L, provided with a button, M, is so arranged that by pressing the button M the rod L will force the zinc plates down into the liquid, thereby causing a current of electricity instantaneously to be evolved. On removing the pressure from the button M the elastic suspenders K, which have been stretched, will now resume their original position and raise the zinc plates, and thus arrest the current. The two electric currents are united at O, the one passing through the interior metallic mounting R secured to the cap A and supporting the charcoal plates D, and the other through the outer mounting, S, against which the rod L connected with the zinc plates E is made to play. The two currents are then conducted by insulating conductors V V', at the end of which there may be arranged a canter, O, or a metallic spiral wire intended to produce an incandescent surface.

The battery is put in action by simply pressing with a finger the button M. The forcing in of air is effected by placing in the mouth the end of the flexible tube and blowing in air through it into the tube E.

Instead of the charcoal plates being stationary they could be made movable, and the whole raised or depressed by any suitable contrivance. The same effects could be produced by arranging the elements stationary and displacing the liquid by any suitable means.

Having thus described my invention, what I claim as new, and desire to secure by Letters Patent, is—

1. The method of agitating the exciting-liquid of a galvanic battery by forcing a current of air through it, in the manner and for the purposes substantially as set forth.

2. Arranging and constructing the zinc and charcoal elements, in combination with the exciting-fluid, substantially in the manner herein described, whereby they may be operated the one by the other, substantially as set forth.

3. Forming the charcoal elements by pressing into or onto the surface of plates of lead, when yet in a semi-liquid state, small pieces of charcoal, in the manner substantially as described.

In testimony whereof I have signed my name to this specification before two subscribing witnesses.

E. GRENET, Fils.

Witnesses:
 E. BARRAULT,
 *Ingr. 33 Bard. St. Martin à Paris.*
 GEO. HUTTON.